(12) United States Patent
Ogihara et al.

(10) Patent No.: US 12,227,632 B2
(45) Date of Patent: Feb. 18, 2025

(54) CELLULOSE ESTER COMPOSITION

(71) Applicant: Daicel Miraizu Ltd., Tokyo (JP)

(72) Inventors: Takayuki Ogihara, Tokyo (JP); Kenji Ueda, Tokyo (JP); Akihiko Kumagae, Tokyo (JP); Akihiko Shiroya, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 717 days.

(21) Appl. No.: 17/437,622

(22) PCT Filed: Apr. 21, 2020

(86) PCT No.: PCT/JP2020/017142
§ 371 (c)(1),
(2) Date: Sep. 9, 2021

(87) PCT Pub. No.: WO2020/218271
PCT Pub. Date: Oct. 29, 2020

(65) Prior Publication Data
US 2022/0177678 A1    Jun. 9, 2022

(30) Foreign Application Priority Data

Apr. 22, 2019  (JP) ................... 2019-080683
Mar. 5, 2020   (JP) ................... 2020-037642

(51) Int. Cl.
*C08L 1/12*   (2006.01)
*C08J 5/18*   (2006.01)
(Continued)

(52) U.S. Cl.
CPC ... *C08L 1/12* (2013.01); *C08J 5/18* (2013.01); *C08K 5/11* (2013.01); *B29C 51/002* (2013.01);
(Continued)

(58) Field of Classification Search
CPC ..... C08K 5/11; C08L 1/10; C08L 1/12; C08L 2203/16; C08J 5/18; C08J 2301/12; C08J 2301/10; B29K 2001/12
See application file for complete search history.

(56) References Cited

U.S. PATENT DOCUMENTS 8,711,480 B2   4/2014  Nimura
9,784,897 B2   10/2017 Nagura et al.
(Continued)

FOREIGN PATENT DOCUMENTS

JP    2005194302 A   7/2005
JP    2007284570 A   11/2007
(Continued)

OTHER PUBLICATIONS

English Translation of the International Preliminary Report on Patentability and Written Opinion, issued in corresponding International Application No. PCT/JP2020/017142, with date of mailing of Jun. 30, 2020 (5 pages).

(Continued)

*Primary Examiner* — Ling Siu Choi
*Assistant Examiner* — Olga Lucia Donahue
(74) *Attorney, Agent, or Firm* — FLYNN THIEL, P.C.

(57) ABSTRACT

A cellulose ester composition having high fluidity, the cellulose ester composition containing a cellulose ester (A), an adipate-based compound (B), and a citrate-based compound (C). When a total of the component (A), the component (B), and the component (C) is 100 mass %, a content of the component (B) is from 7 to 20 mass %, a content of the component (C) is from 1 to 14 mass %, a total content of the component (B) and the component (C) is from 21 to 30 mass %, and the remainder is the component (A).

8 Claims, 4 Drawing Sheets

(51) Int. Cl.
*C08K 5/11* (2006.01)
*B29C 51/00* (2006.01)
*B29K 1/00* (2006.01)

(52) U.S. Cl.
CPC ....... *B29K 2001/12* (2013.01); *C08J 2301/12* (2013.01); *C08K 2201/014* (2013.01); *C08L 2203/16* (2013.01)

(56) References Cited

U.S. PATENT DOCUMENTS

| | | | |
|---|---|---|---|
| 10,494,503 | B2 | 12/2019 | Imanishi et al. |
| 2011/0229662 | A1 | 9/2011 | Kamee et al. |
| 2011/0319531 | A1 | 12/2011 | Helmer et al. |
| 2013/0169921 | A1* | 7/2013 | Orsi Mazzucchelli ..................... G02C 7/022 106/170.18 |

FOREIGN PATENT DOCUMENTS

| | | |
|---|---|---|
| JP | 201152205 A | 3/2011 |
| JP | 2011186358 A | 9/2011 |
| JP | 2012220823 A | 11/2012 |
| JP | 6170654 B2 | 1/2014 |
| JP | 6038639 B2 | 7/2014 |
| JP | 5798640 B2 | 10/2015 |
| JP | 2015227955 A | 12/2015 |

OTHER PUBLICATIONS

Indian Office Action issued in corresponding Indian Application No. 202117041104 dated Feb. 16, 2023 (6 pages).

Search Report issued in corresponding European Application No. 20795333.2, dated Dec. 13, 2022 (5 pages).

* cited by examiner

CELLULOSE ESTER COMPOSITION

TECHNICAL FIELD

In an exemplary aspect, the present invention relates to a cellulose ester composition and a molded article obtained from the cellulose ester composition.

BACKGROUND ART

Cellulose esters such as cellulose acetate generally exhibit poor thermoplasticity, and therefore are commonly used as compositions containing a plasticizer. JP 5798640 B indicates that from 1 to 50 parts by mass of an adipate represented by formulas (I) to (III) can be blended with respect to 100 parts by mass of a cellulose ester.

JP 6038639 B describes a cellulose ester composition containing, per 100 parts by mass of a cellulose ester (A), from 5 to 50 parts by mass of an adipate-based compound (B) and from 1 to 50 parts by mass of a phosphate (C) having a cresyl group and represented by general formula (I), and indicates that through this composition, bleed-out of the plasticizer is suppressed.

JP 6170654 B discloses a cellulose ester composition containing, per 100 parts by mass of a cellulose ester (A), from 5 to 50 parts by mass of a phosphate (B) having a naphthyl group and represented by general formula (I), and from 5 to 40 parts by mass of an ester-based plasticizer (D) other than the aforementioned (B), and indicates that a resin molded body having high thermoplasticity and good mechanical strength can be obtained by using this composition.

SUMMARY OF INVENTION

In an exemplary aspect, the present invention provides a cellulose ester composition having high fluidity, and a molded article obtained from such a cellulose ester composition.

In an exemplary aspect, the present invention provides a cellulose ester composition containing a cellulose ester as a component (A), an adipate-based compound as a component (B), and a citrate-based compound as a component (C), wherein when a total of the component (A), the component (B), and the component (C) is 100 mass %, a content of the component (B) is from 7 to 20 mass %, a content of the component (C) is from 1 to 14 mass %, a total content of the component (B) and the component (C) is from 21 to 30 mass %, and the remainder is the component (A). In another exemplary aspect, the present invention provides a molded article obtained from the cellulose ester composition described herein.

The cellulose ester composition according to an exemplary aspect of the present invention has high fluidity. In addition, according to an exemplary aspect, when the cellulose ester composition of the present invention is used, a cellulose ester molded body with suppressed bleed-out from the surface of the molded body is obtained.

DESCRIPTION OF EMBODIMENTS (Cellulose Ester Composition)

<Component (A)>

Figure 1:
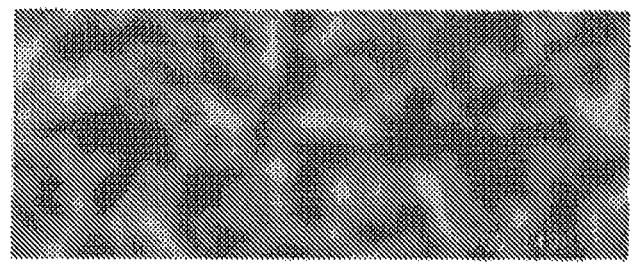
FIG. 1 is a plan view of a sheet having a tortoise shell pattern according to one example of the present invention.

In an exemplary embodiment of the present invention, the cellulose ester of the component (A) used in the cellulose ester composition may be a known cellulose ester (for example, a cellulose ester described in JP 2005-194302 A), and examples thereof include cellulose acetate, cellulose propionate, cellulose butyrate, cellulose acetate propionate, and cellulose acetate butyrate. According to one preferable example, the cellulose ester of the component (A) can be selected from cellulose acetate, cellulose acetate propionate, and cellulose acetate butyrate, and according to another preferable example, the cellulose ester can be selected from cellulose acetate.

In addition to the above, examples of the cellulose ester of the component (A) include polycaprolactone-grafted cellulose acetate, acetyl methyl cellulose, acetyl ethyl cellulose, acetyl propyl cellulose, acetyl hydroxyethyl cellulose, and acetyl hydroxypropyl cellulose.

According to a preferable aspect of the present invention, the cellulose ester of the component (A) can be a cellulose acetate having an average degree of substitution of not greater than 2.7. According to a preferable aspect of the present invention, the cellulose ester of component (A) can have a viscosity-average degree of polymerization from 100 to 1000, and according to another preferable aspect, the viscosity-average degree of polymerization can be from 100 to 500. According to one example, a cellulose acetate commercially available under the trade name "L50" from Daicel Corporation can be used as the cellulose ester of the component (A).

<Component (B)>

In an exemplary embodiment of the present invention, a well-known adipate-based compound can be used as the adipate-based compound of the component (B) that is used in the cellulose ester composition, and examples thereof include dibutyl adipate, dioctyl adipate, dibutoxyethoxy ethyl benzyl adipate, dibutoxyethoxy ethyl adipate, and mixtures thereof. In yet another example, adipate compounds represented by formulas (I) to (III) and described in JP 5798640 B, and mixtures thereof can be used as the adipate-based compound of the component (B). According to to one example, a product commercially available under the trade name "DAIFATTY-101" from Daihachi Chemical Industry Co., Ltd. can be used as the adipate-based compound of component (B).

<Component (C)>

In an exemplary embodiment of the present invention, a well-known citrate-based compound can be used as the citrate-based compound of the component (C) used in the cellulose ester composition, and examples thereof include triethyl citrate, acetyl tributyl citrate, and acetyl triethyl citrate. A preferable aspect of the component (C) is triethyl citrate, and as the triethyl citrate, a triethyl citrate commercially available under the trade name "Citroflex 2" (available from Morimura Bros., Inc.) can be used.

As also indicated in the above-mentioned JP 5798640 B, an adipate-based compound can be used as a plasticizer in a cellulose ester composition, but when the blending amount is increased to further improve plasticity and fluidity, bleed-out occurs, which is a problem. However, according to an example of the present invention, a cellulose ester composition having a good balance between bleeding resistance and fluidity can be obtained by using an adipate-based compound in combination with a citrate-based compound in amounts within the numerical ranges exemplified below.

In an exemplary embodiment of the present invention, from the perspective of suppressing bleed-out and achieving excellent fluidity, when the total content of the components (A), (B), and (C) is 100 mass %, the cellulose ester composition can have a total content of the component (B) and the component (C) from 21 to 30 mass % with the remainder being the component (A). From the perspective of suppressing bleed-out and achieving excellent fluidity, when the total content of the components (A), (B), and (C) is 100 mass %, the total content of the component (B) and the component (C) can be from 21 to 29 mass % in one preferable aspect of the present invention, from 21 to 26 mass % in another preferable aspect of the present invention, and from 23 to 26 mass % in yet another preferable aspect of the present invention, and the remainder may be the component (A), with the proportion of the remainder being such that the total is 100 mass %.

From the perspective of suppressing bleed-out, an upper limit value of the total content of the component (B) and the component (C) can be 30 mass % in one preferable example, 29 mass % in another preferable example, and 26 mass % in yet another preferable example, and from the perspective of obtaining excellent fluidity, the lower limit value can be 21 mass % in one preferable example and 23 mass % in another preferable example.

In an exemplary embodiment of the present invention, from the perspective of suppressing bleed-out and achieving excellent fluidity, when the total content of the components (A), (B), and (C) is 100 mass %, the content of the component (B) in the cellulose ester composition can be from 7 to 20 mass %. From the perspective of suppressing bleed-out and achieving excellent fluidity, the content of the component (B) can be from 10 to 20 mass % in a preferable aspect of the present invention, from 11 to 20 mass % in another preferable aspect of the present invention, and from 15 to 20 mass % in yet another preferable aspect of the present invention.

From the perspective of suppressing bleed-out, the upper limit value of the content of the component (B) can be 20 mass % in one preferable example and 18 mass % in another preferable example, and from the perspective of obtaining favorable fluidity, the lower limit value can be 7 mass % in one preferable example, 10 mass % in another preferable example, 11 mass % in yet another preferable example, and 15 mass % in still another preferable example.

In the cellulose ester composition of an exemplary embodiment of the present invention, from the perspective of suppressing a mass change in hot, humid conditions and achieving excellent fluidity, when the total content of the components (A), (B), and (C) is 100 mass %, the content of the component (C) can be from 1 to 14 mass %. From the perspective of suppressing a mass change in hot, humid conditions and achieving excellent fluidity, the content of the component (C) can be from 2 to 14 mass % in one preferable aspect of the present invention, from 3 to 14 mass % in another preferable aspect of the present invention, from 4 to 12 mass % in another preferable aspect of the present invention, and from 5 to 10 mass % in yet another preferable aspect of the present invention.

From the perspective of suppressing a mass change in hot, humid conditions, the upper limit value of the content of the component (C) can be 14 mass % in one preferable example, 12 mass % in another preferable example, and 10 mass % in another preferable example, and from the perspective of obtaining excellent fluidity, the lower limit value can be 1 mass % in one preferable example, 2 mass % in another preferable example, 3 mass % in yet another preferable example, 4 mass % in yet another preferable example, and 5 mass % in yet another preferable example.

Additionally, in the cellulose ester composition an exemplary embodiment of the present invention, from the perspective of suppressing bleed-out and achieving excellent fluidity, a ratio (mass ratio) [(B)/(C)] of the content of the component (B) to the content of the component (C) may be from 1 to 5. From the perspective of suppressing bleed-out and achieving excellent fluidity, this mass ratio may be from 1.5 to 5 in another preferable aspect of the present invention, and from 1.5 to 3 in yet another preferable aspect of the present invention. From the perspective of suppressing bleed-out while maintaining a high level of fluidity, the upper limit value of the mass ratio (B)/(C) may be 5 in one preferable example and 3 in another preferable example, and the lower limit value may be 1 in one preferable example and 1.5 in another preferable example.

In an exemplary embodiment of the present invention, the cellulose ester composition can contain a known thermoplastic resin according to the application. Examples of known thermoplastic resins include styrene-based resins such as ABS resin and AS resin, polycarbonate-based resins, polyolefin-based resins such as polyethylene and polypropylene, polyamide-based resins such as polyamide 6, polyamide 66, polyamide 610, and polyamide 612, acrylic resins, methacrylic resins, polyester resins, polyacetal resins, and polyphenylene sulfide resins.

In a total of 100 mass % of the cellulose ester of the component (A) and the thermoplastic resin, the content percentage of the thermoplastic resin can be, for example, 40 mass % or less in one preferable aspect of the present invention, and 20 mass % or less in another preferable aspect of the present invention.

In an exemplary embodiment of the present invention, the cellulose ester composition can further contain a filler. Examples of fillers include fibrous fillers, and non-fibrous fillers (such as granular or tabular fillers), and may include, for example, the fillers described in paragraphs [0025] to [0032] of JP 2005-194302 A.

With respect to 100 parts by mass of the cellulose ester of the component (A), the content of the filler can be, for example, from 5 to 50 parts by mass in one preferable aspect of the present invention, from 5 to 40 parts by mass in another preferable aspect of the present invention, and from 5 to 30 parts by mass in yet another preferable aspect of the present invention.

In an exemplary embodiment of the present invention, the cellulose ester composition can contain a stabilizing agent such as an epoxy compound described in paragraphs [0035] to [0042] of JP 2005-194302 A, and an organic acid, a thioether compound, and a phosphite compound described in paragraphs [0043] to [0052] thereof.

In an exemplary embodiment of the present invention, the cellulose ester composition may contain, depending on the application, a commonly used additive such as another stabilizer (e.g., an antioxidant, UV absorber, thermal stabilizer, and light-resistant stabilizer), a colorant (such as a dye or pigment), an antistatic agent, a flame retardant, a flame retardant auxiliary agent, a lubricant, an anti-blocking agent, a dispersant, an anti-dripping agent, and an antibacterial agent.

According to an exemplary embodiment of the present invention, the cellulose ester composition may be prepared, for example, by using a mixer such as a tumbler mixer, a Henschel mixer, a ribbon mixer, or a kneader to mix the various components in a dry or wet state. After the components have been pre-mixed using the mixer, a method of kneading the mixture with an extruder such as a single-screw or a twin-screw extruder to prepare the cellulose ester composition in the form of pellets, or a method of melting and kneading the mixture with a kneader such as heated rollers or a Banbury mixer to prepare the cellulose ester composition can be used.

(Molded Article)

In an exemplary embodiment of the present invention, the cellulose ester composition can be molded into various molded articles through injection molding, extrusion molding, multilayer extrusion molding, press molding, vacuum molding, profile molding, foam molding, injection press molding, blow molding, or gas injection molding.

When extrusion molding or multilayer extrusion molding are to be implemented, a method can be used in which a single-layer sheet or a multilayer sheet is molded by extrusion using a T-die in combination with one extruder or a plurality of extruders. When a multilayer sheet is to be manufactured, a plurality of sheets having different colors or patterns can be laminated. At this time, a mixture of a plurality of types of pellets can be used as the raw material pellets.

The sheet extrusion conditions can include, as an example, a cylinder temperature from 170 to 240° C. and a die temperature from 200 to 240° C. The sheet thickness can be adjusted by adjusting the lip opening of the die (T die).

For press molding, a method can be adopted in which a mixture of a plurality of types of pellets is dispersed and disposed in a mold and hot press molded in that state to thereby obtain a sheet, or a method can be adopted in which a plurality of sheets with different colors or patterns are laminated and then hot press molded in that state to obtain a sheet.

The sheet (or multilayer sheet) to be molded can be selected from a sheet having a surface in which a plurality of colors are combined, a sheet having a surface in which a plurality of patterns are combined, a sheet having a surface in which a plurality of colors and a plurality of patterns are combined, a sheet in which lightness and darkness are formed, and a sheet in which a color gradation is formed.

Figure 2:
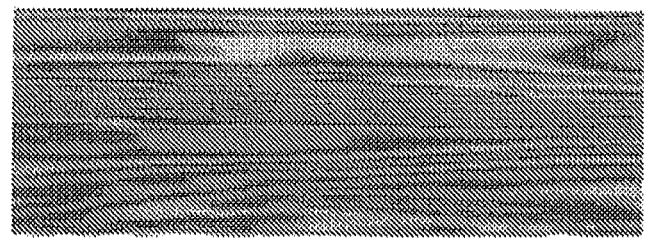
FIG. 2 is a plan view of a sheet having a wood grain pattern according to another example of the present invention.
Figure 3:
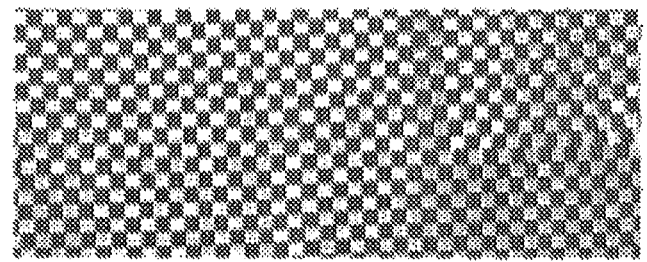
FIG. 3 is a plan view of a sheet having a checkerboard pattern according to another example of the present invention.
Figure 4:
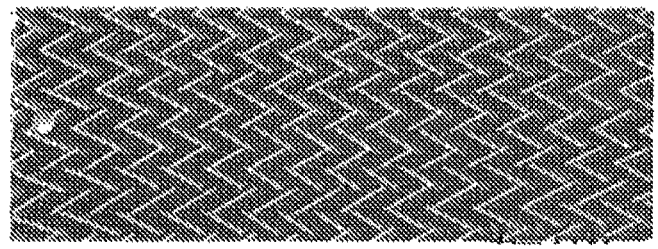
FIG. 4 is a plan view of a sheet having a woven-bamboo pattern according to another example of the present invention.

Examples of the pattern (design) of the sheet (or multilayer sheet) to be molded include a tortoise shell pattern (FIG. 1), a camouflage pattern, a marbled pattern, a pattern of various stripes, a wood grain pattern (FIG. 2), a pearl oyster pattern, a granite pattern, a ivory pattern, a checkerboard pattern (FIG. 3), a buffalo pattern, a woven bamboo pattern (FIG. 4), a stained glass pattern, a bamboo grass pattern, and a snakeskin-like pattern.

In an exemplary embodiment of the present invention, the cellulose ester composition can be used, for example, to manufacture molded articles having a pattern (design) or no pattern, such as frames for sunglasses and eyeglasses, a shoelace tipping film (used by surrounding the tip end part of a shoelace with the film and heat-shrinking the film) for various shoes, and goggles; cosmetic containers; oral care products such as handles of toothbrushes and interdental brushes; makeup articles such as handles of cheek brushes, eyebrow brushes, and lip brushes; hair care articles such as hair accessories, hair dryers, hair irons, hair brushes, and combs; writing instruments such as the shaft of ink pens; personal care items such as razor handles; toys; household appliances, and tools. Among these, an eyeglass frame in which the cellulose ester composition according to an embodiment of the present invention is used exhibits excellent processability, tactile sensation, color sensation, and impact resistance.

In another exemplary embodiment of the present invention, the cellulose ester composition can be used in various parts, housings, and the like in the OA and household appliance field, the electrical and electronic device field, the communication equipment field, the sanitary field, transportation device fields such as the automotive field, housing related fields such as furniture and building materials, and the field of miscellaneous goods. In addition, from the perspective of being a non-petroleum-based resin, the cellulose ester composition can also be used in cutlery such as straws, spoons, and forks, and in packaging sheets, films, containers, and the like for food products or other various products.

Each of the molded articles described above can be manufactured using, for example, an injection molding method or the like as described above. Also, in some examples, a molded article such as frames for sunglasses or eyeglasses, and shoelace tipping films for various types of shoes can be manufactured by punching and processing a single sheet or a laminated product of a plurality of sheets.

The thickness of the sheet for manufacturing shoelace tippings can be, for example, in a range from 0.25 to 0.5 mm, and the thickness of the eyeglass sheet can be, for example, in a range from 4 to 12 mm.

The sheet for manufacturing shoelace tippings can be manufactured by, for example, extruding the cellulose ester composition from a T-die of an extruder to form a sheet, and then winding the extruded sheet around a wide jumbo roll, cutting with a cutter, and then forming a roll (roll of a sheet) of a predetermined width using a slitter such that the roll has a small width of approximately twice the width required for the shoelace tip. The sheet for manufacturing an eyeglass frame can be manufactured by, for example, extruding the cellulose ester composition from a T-die of an extruder to form a sheet, cutting the sheet, and then repeatedly press molding.

Note that the configurations, combinations thereof, and the like in each embodiment described herein are merely examples, and various additions, omissions, substitutions, and other changes may be made, as appropriate, without departing from the spirit of the present invention. The present invention is not limited by the embodiments and is limited only by the claims.

EXAMPLES

Examples and Comparative Examples

Each of the compositions shown in Table 1 was prepared by using a Henschel mixer to mix the cellulose ester of the component (A), the adipate-based compound of the component (B), and the citrate-based compound of component (C) under stirring such that the inside of the mixer became 70° C. or higher due to frictional heat, after which each composition was supplied to a twin screw extruder (cylinder temperature: 200° C., die temperature: 210° C.) and extruded and pelletized.

The obtained pellets were supplied to an injection molding machine, and a 90 mm×50 mm×3 mm test piece was injection molded under conditions including a cylinder temperature of 220° C., a mold temperature of 50° C., and a molding cycle of 60 seconds (injection: 20 seconds, mass decreased by an amount equal to or greater than the amount of increase, and this decrease is thought to be due to factors such as the release of the plasticizer.

TABLE 1

|  | Examples | | | | | Comparative Examples | | | | | |
| --- | --- | --- | --- | --- | --- | --- | --- | --- | --- | --- | --- |
|  | 1 | 2 | 3 | 4 | 5 | 1 | 2 | 3 | 4 | 5 | 6 |
| (A) Cellulose Acetate (mass %) | 75 | 75 | 78 | 75 | 70 | 80 | 65 | 85 | 80 | 70 | 77 |
| (B) Adipate-based compound (mass %) | 18 | 20 | 15 | 15 | 20 | 20 | 20 | 15 | 15 | 15 | 23 |
| (C) Citrate-based compound (mass %) | 7 | 5 | 7 | 10 | 10 | 0 | 15 | 0 | 5 | 15 | 0 |
| Total (mass %) | 100 | 100 | 100 | 100 | 100 | 100 | 100 | 100 | 100 | 100 | 100 |
| (B) + (C) (mass %) | 25 | 25 | 22 | 25 | 30 | 20 | 35 | 15 | 20 | 30 | 23 |
| (B)/(C) (mass ratio) | 2.6 | 4 | 2.1 | 1.5 | 2 | — | 1.3 | — | 3 | 1 | — |
| Bar flow length (mm) 220° C., 50 MPa | 187 | 190 | 145 | 169 | 270 | 127 | 355 | 62 | 112 | 275 | 138 |
| 220° C., 100 MPa | 380 | 388 | 301 | 362 | 513 | 256 | 658 | 144 | 260 | 520 | 277 |
| Bleed-out under hot, humid conditions | Good | Good | Good | Good | Marginal | Good | Poor | Good | Good | Poor | Poor |
| Mass change under hot, humid conditions | 2.40% | 2.40% | 2.10% | 1.90% | −0.50% | 4.40% | −5.70% | 4.70% | 3.60% | −2.40% | — | cooling time: 40 seconds). The test pieces were used in each evaluation test.

<Components Used>

Component (A)

Cellulose ester: trade name "L50" (cellulose acetate), degree of substitution of 2.5, viscosity-average degree of polymerization of 180, available from Daicel Corporation Component (B)

Adipate-based compound: trade name "DAIFATTY-101" available from Daihachi Chemical Industry Co., Ltd.

Component (C)

Citrate-based compound: trade name: "Citroflex 2", available from Morimura Bros., Inc.

<Measurement Test>

(Bar Flow Length)

Pellets were injection molded at a cylinder temperature of 220° C. and an injection pressure of 50 MPa or 100 MPa using the following bar flow mold, and the flow length at that time was evaluated.

Bar flow mold: A mold in which a flow channel having a track shape of an athletic field was formed. The cross-sectional shape of the flow channel was rectangular with a width of 2 cm and a thickness of 2 mm. The tip end of the flow channel was opened.

(Bleed-Out Under Hot, Humid Conditions)

The presence or absence of bleed-out of the plasticizer was visually observed when a test piece formed as described above was left to stand for 500 hours in an atmosphere at 65° C. and 85% RH. Test pieces for which bleed-out was not observed were evaluated as being good, test pieces in which bleed-out was clearly observed were evaluated as being poor, and test pieces in which bleed-out was slightly observed but was within the acceptable range were evaluated as being marginal.

(Mass Change Under Hot, Humid Conditions)

The mass loss rate when a test piece molded as described above was left to stand for 500 hours in an atmosphere at 65° C. and 85% RH was determined. Under such high temperature, high humidity conditions, all of the test pieces increased in mass due to water absorption, but in the case of materials with poor performance, a reduction in mass occurred due to factors such as bleeding or vaporization of the plasticizer, and decomposition. For example, in Comparative Examples 2 and 5, although an increase in mass initially occurred due to water absorption, subsequently, the From Examples 1 to 5 and Comparative Examples 1, 3, and 6, it was confirmed that by using the adipate-based compound of the component (B) and the citrate-based compound of the component (C), bleed-out of the adipate-based compound of component (B) can be prevented while achieving a high level of fluidity (bar flow length). Additionally, from Examples 1 to 5 and Comparative Examples 1 to 4, it was confirmed that by setting the total content of the component (B) and the component (C) to be within the predetermined ranges, bleed-out of the component (B) and the component (C) under hot, humid conditions can be prevented while maintaining the fluidity (bar flow length) at a high level.

Furthermore, from Examples 1 to 5 and Comparative Example 5, it was confirmed that by setting the content of the component (C) to within the predetermined range, bleed-out of the component (B) and the component (C) under hot, humid conditions can be prevented while maintaining the fluidity (bar flow length) at a high level. It was also confirmed from Examples 1 to 5 and Comparative Example 6 that bleed-out of the component (B) and the component (C) under hot, humid conditions can be prevented by setting the content of the component (B) to be within the predetermined range.

Example 6 (Manufacture of a Shoelace Tipping Film)

A sheet T-die was set in a single screw extruder, the cellulose ester composition pellets of Example 2 were placed therein, the cylinder temperature was set to 200° C. and the die temperature was set to 210° C., and a shoelace tipping sheet (film for shoelace tipping) having an average thickness of 0.4 mm was manufactured. The sheet was wound around a wide jumbo roll, cut with a cutter, and processed into a roll sheet (roll film) having a width of 34 mm.

The invention claimed is:

1. A cellulose ester composition comprising a cellulose ester as a component (A), an adipate-based compound as a component (B), and a citrate-based compound as a component (C), wherein
when a total mass of the component (A), the component (B), and the component (C) is 100 mass %, a content of the component (B) is from 7 to 20 mass %, a content of the component (C) is from 1 to 14 mass %, a total content of the component (B) and the component (C) is from 21 to 30 mass %, and the remainder is the component (A).

2. The cellulose ester composition according to claim 1, wherein the content of the component (B) is from 10 to 20 mass %, and the content of the component (C) is from 4 to 12 mass %.

3. The cellulose ester composition according to claim 1, wherein a mass ratio [(B)/(C)] of the component (B) to the component (C) is from 1 to 5.

4. The cellulose ester composition according to claim 1, wherein the citrate-based compound of the component (C) is triethyl citrate.

5. The cellulose ester composition according to claim 1, wherein the cellulose ester of the component (A) is selected from cellulose acetate, cellulose acetate propionate, and cellulose acetate butyrate.

6. An eyeglass frame or tipping film for shoelaces formed from the cellulose ester composition described in claim 1.

7. A sheet formed from the cellulose ester composition described in claim 1, wherein the sheet is selected from a sheet having a surface in which a plurality of colors are combined, a sheet having a surface in which a plurality of patterns are combined, a sheet having a surface in which a plurality of colors and a plurality of patterns are combined, a sheet in which lightness and darkness are formed, and a sheet in which a color gradation is formed.

8. A molded article formed by punching the sheet described in claim 7.

\* \* \* \* \*